United States Patent
Nakadai et al.

(10) Patent No.: US 9,697,832 B2
(45) Date of Patent: Jul. 4, 2017

(54) SPEECH RECOGNITION APPARATUS AND SPEECH RECOGNITION METHOD

(71) Applicant: HONDA MOTOR CO., LTD., Tokyo (JP)

(72) Inventors: Kazuhiro Nakadai, Wako (JP); Takeshi Mizumoto, Wako (JP); Keisuke Nakamura, Wako (JP); Masayuki Takigahira, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/180,218

(22) Filed: Jun. 13, 2016

(65) Prior Publication Data

US 2016/0372134 A1     Dec. 22, 2016

(30) Foreign Application Priority Data

Jun. 18, 2015 (JP) ................................ 2015-122843

(51) Int. Cl.
| | |
|---|---|
| *G10L 15/20* | (2006.01) |
| *G10L 25/78* | (2013.01) |
| *G10L 21/0272* | (2013.01) |
| *G10L 21/0216* | (2013.01) |
| *G10L 21/028* | (2013.01) |

(52) U.S. Cl.
CPC ............ *G10L 15/20* (2013.01); *G10L 21/028* (2013.01); *G10L 21/0272* (2013.01); *G10L 25/78* (2013.01); *G10L 2021/02166* (2013.01)

(58) Field of Classification Search
CPC ..... G10L 21/028; G10L 15/20; G10L 21/0272; G10L 25/78
See application file for complete search history.

(56) References Cited

U.S. PATENT DOCUMENTS

| | | | | |
|---|---|---|---|---|
| 2004/0175006 A1* | 9/2004 | Kim | ..................... | H04R 1/406 381/92 |
| 2009/0055170 A1* | 2/2009 | Nagahama | .............. | G10L 15/20 704/226 |
| 2009/0285409 A1* | 11/2009 | Yoshizawa | ............ | G01S 3/8083 381/92 |
| 2011/0182437 A1* | 7/2011 | Kim | .................... | G10L 21/0232 381/73.1 |
| 2012/0239394 A1* | 9/2012 | Matsumoto | ............. | G10L 25/84 704/233 |

(Continued)

FOREIGN PATENT DOCUMENTS

WO     2006-025106     3/2006

*Primary Examiner* — Samuel G Neway
(74) *Attorney, Agent, or Firm* — Rankin, Hill & Clark LLP

(57) ABSTRACT

A speech recognition apparatus includes: a sound collection unit that collects a sound signal; a sound source localization unit that calculates a spatial spectrum from the sound signal that is collected by the sound collection unit and uses the calculated spatial spectrum to perform sound source localization; a speech zone determination unit that determines a zone in which a power of the spatial spectrum that is calculated by the sound source localization unit exceeds a predetermined threshold value based on a vehicle state; and a speech recognition unit that performs speech recognition with respect to a sound signal of the zone determined by the speech zone determination unit.

7 Claims, 7 Drawing Sheets

(56) References Cited

U.S. PATENT DOCUMENTS

| | | | |
|---|---|---|---|
| 2013/0051569 A1* | 2/2013 | Nakadai | H04R 3/005 381/56 |
| 2014/0067385 A1* | 3/2014 | Oliveira | G10L 21/0208 704/226 |
| 2014/0241126 A1* | 8/2014 | Funayama | G01S 3/808 367/129 |
| 2016/0372134 A1* | 12/2016 | Nakadai | G10L 21/0264 |

* cited by examiner

FIG. 6

| DRIVER SEAT | WIPER ON | WIPER OFF |
|---|---|---|
| EQUAL TO OR LESS THAN 10 km/h | 29.0 dB | 29.0 dB |
| MORE THAN 10 km/h, AND EQUAL TO OR LESS THAN 30 km/h | 29.0 dB | 30.5 dB |
| MORE THAN 30 km/h, AND EQUAL TO OR LESS THAN 50 km/h | 30.0 dB | 30.5 dB |
| MORE THAN 50 km/h | 30.5 dB | 30.5 dB |

FIG. 7

| PASSENGER SEAT | WIPER ON | WIPER OFF |
|---|---|---|
| EQUAL TO OR LESS THAN 10 km/h | 28.0 dB | 28.0 dB |
| MORE THAN 10 km/h, AND EQUAL TO OR LESS THAN 30 km/h | 28.0 dB | 28.5 dB |
| MORE THAN 30 km/h, AND EQUAL TO OR LESS THAN 50 km/h | 29.0 dB | 29.5 dB |
| MORE THAN 50 km/h | 29.5 dB | 29.5 dB |

SPEECH RECOGNITION APPARATUS AND SPEECH RECOGNITION METHOD

CROSS-REFERENCE TO RELATED APPLICATION

Priority is claimed on Japanese Patent Application No. 2015-122843, filed on Jun. 18, 2015, the contents of which are incorporated herein by reference.

BACKGROUND

Field of the Invention

The present invention relates to a speech recognition apparatus and a speech recognition method.

Background

In a vehicle, speech recognition apparatuses have been proposed in which a navigation system or the like is operated by a command according to speech.

In such a speech recognition apparatus, for each seat position, a sound source position of speech of a speaker seated in the seat is stored as preset information in advance. Then, the speech recognition apparatus searches preset information based on the seat position detected by a sensor, refers to the searched preset information, and separates speech of a speaker seated on a driver seat from speech of a speaker seated on a passenger seat to perform speech recognition (for example, refer to Republished Japanese Translation WO2006/025106).

SUMMARY

However, in the technique disclosed in Republished Japanese Translation WO2006/025106, there is a problem that noise generated in response to a vehicle state may be recognized as speech, and the accuracy of speech recognition is degraded. Here, the vehicle state is a travel state depending on a vehicle speed, an open and close state of a door, an operation state of a wiper, or the like.

An object of an aspect of the present invention is to provide a speech recognition apparatus and a speech recognition method capable of reducing the effect of noise that is generated in response to a vehicle state.

(1) A speech recognition apparatus according to an aspect of the present invention includes: a sound collection unit that collects a sound signal; a sound source localization unit that calculates a spatial spectrum from the sound signal that is collected by the sound collection unit and uses the calculated spatial spectrum to perform sound source localization; a speech zone determination unit that determines a zone in which a power of the spatial spectrum that is calculated by the sound source localization unit exceeds a predetermined threshold value based on a vehicle state; and a speech recognition unit that performs speech recognition with respect to a sound signal of the zone determined by the speech zone determination unit.

(2) In the aspect of the above (1), the vehicle state may be at least one of a travel state of the vehicle and an operation state of the vehicle.

(3) In the aspect of the above (1) or (2), a travel state of the vehicle may be a state based on a vehicle speed, and an operation state of the vehicle may be at least one of an open and close state of a power window, an open and close state of a door, and an operation state of a wiper.

(4) In the aspect of any one of the above (1) to (3), the speech recognition apparatus may include a sound source separation unit that separates a speech signal of a driver seated on a driver seat from a speech signal of a passenger seated on a passenger seat based on the sound source localization result by the sound source localization unit, wherein the speech recognition unit may determine a zone in which a power of the spatial spectrum exceeds a predetermined threshold value based on the vehicle state with respect to the speech signal of the driver separated by the sound source separation unit or the speech signal of the passenger separated by the sound source separation unit.

(5) In the aspect of the above (4), the predetermined threshold value may be associated with a vehicle speed, an operation state of the vehicle, and a sound source of the driver or a sound source of the passenger.

(6) In the aspect of the above (4) or (5), the predetermined threshold value may be configured such that the predetermined threshold value with respect to a sound source of the driver is greater than the predetermined threshold value with respect to a sound source of the passenger.

(7) A speech recognition method according to another aspect of the present invention includes: (a) by way of a sound collection unit, collecting a sound signal; (b) by way of a sound source localization unit, calculating a spatial spectrum from the sound signal that is collected in (a) and using the calculated spatial spectrum to perform sound source localization; (c) by way of a speech zone determination unit, determining a zone in which a power of the spatial spectrum that is calculated in (b) exceeds a predetermined threshold value based on a vehicle state; and (d) by way of a speech recognition unit, performing speech recognition with respect to a sound signal of the zone determined in (c).

According to the configuration of (1) or (7), it is possible to reduce the effect of noise that is generated in response to a vehicle state.

Further, according to the configuration of (2), it is possible to detect a speech zone of a sound source by using a threshold value in response to at least one of the travel state and the operation state of the vehicle.

Further, according to the configuration of (3), it is possible to detect a speech zone of a sound source by using a threshold value according to at least one of the state based on the vehicle speed, the open and close state of the power window, the open and close state of the door, and the operation state of the wiper.

Further, according to the configuration of (4), it is possible to reduce the effect of noise that is generated in response to a vehicle state by performing speech recognition using a speech signal of a zone in which the speech of the driver or the passenger after the sound source separation is equal to or more than the threshold value.

Further, according to the configuration of (5), it is possible to appropriately detect a speech zone of the driver or the passenger by using a threshold value for each vehicle speed, for each operation state of the vehicle, and for each driver or passenger.

Further, according to the configuration of (6), it is possible to perform speech recognition such that the speech of the driver is prioritized to the speech of the passenger.

BRIEF DESCRIPTION OF THE DRAWINGS

FIG. 6 is a view showing an example of a threshold value with respect to the speech signal of the driver seated on the driver seat that is stored in a threshold value storage unit according to the embodiment.

FIG. 7 is a view showing an example of a threshold value with respect to the speech signal of the passenger seated on the passenger seat that is stored in the threshold value storage unit according to the embodiment.

DESCRIPTION OF THE EMBODIMENTS

Hereinafter, an embodiment of the present invention will be described with reference to the drawings. Further, in the following description, an example in which a speech recognition apparatus is provided in a vehicle is described.

<Configuration of Speech Recognition Apparatus>

Figure 1:
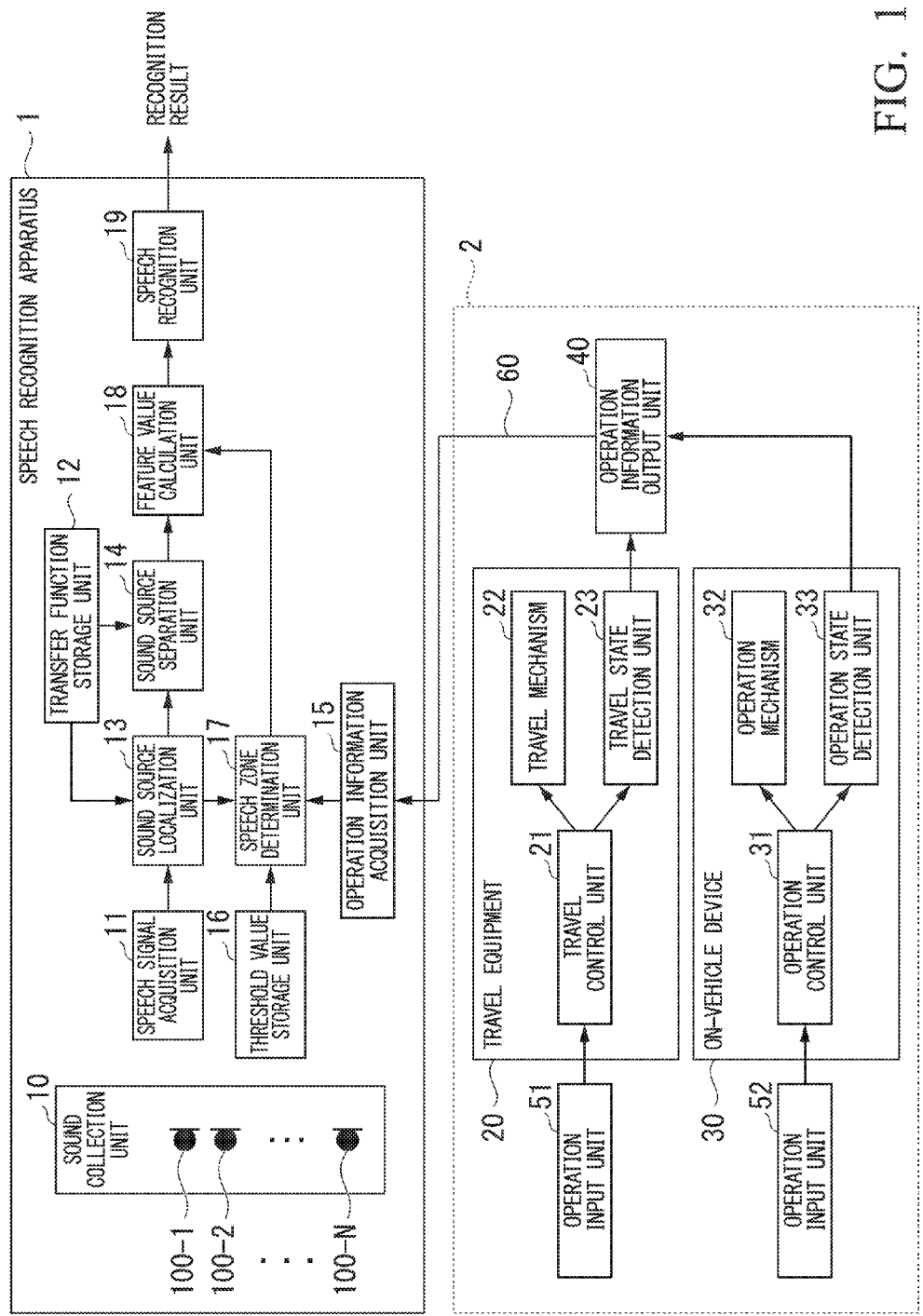
FIG. 1 is a block diagram showing a configuration of a speech recognition apparatus according to an embodiment.
Figure 2:
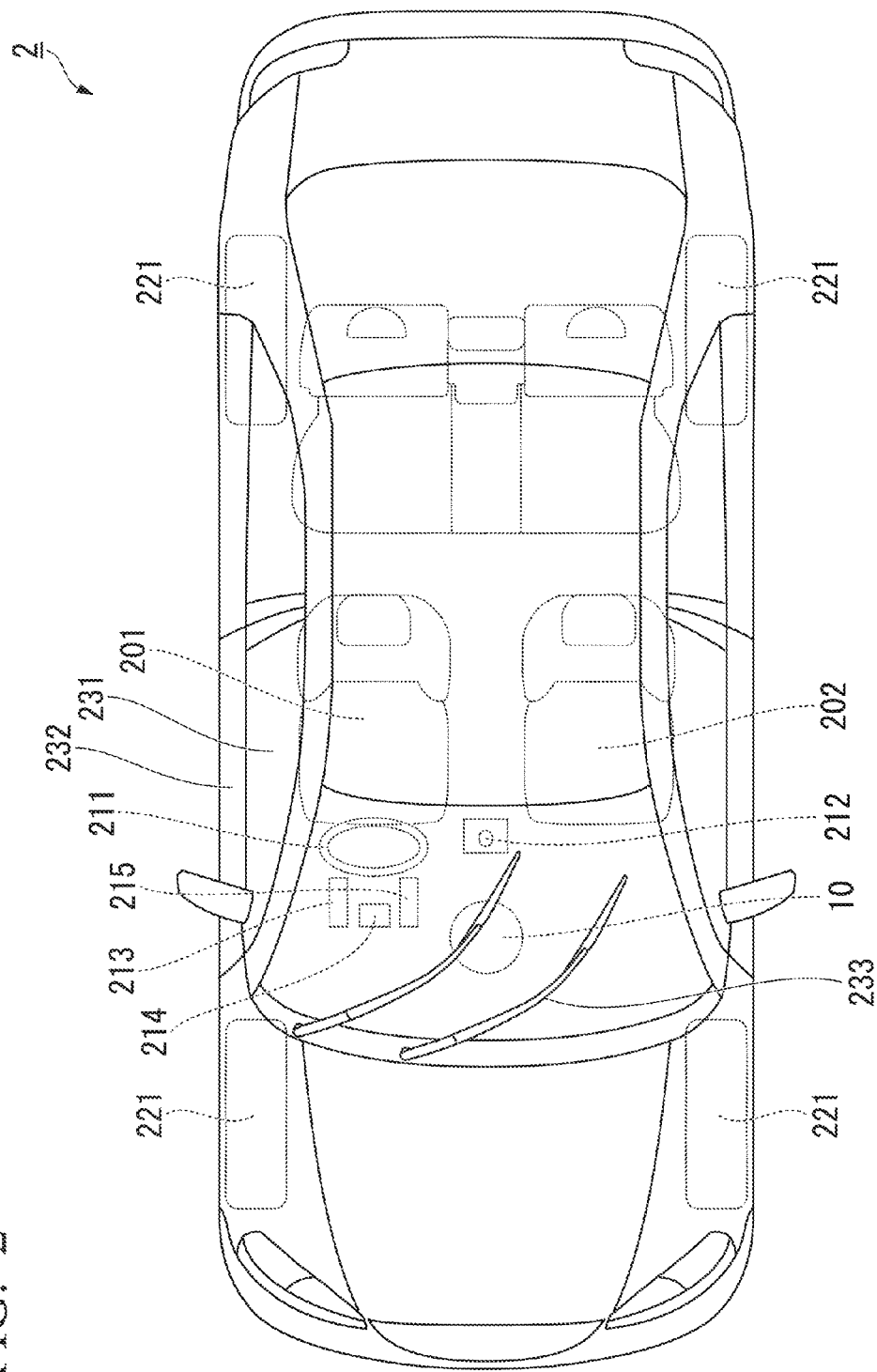
FIG. 2 is a diagram showing an example of a configuration that is included in a vehicle according to the embodiment.

FIG. 1 is a block diagram showing a configuration of a speech recognition apparatus 1 according to the present embodiment. FIG. 2 is a diagram showing an example of a configuration that is included in a vehicle 2 according to the present embodiment.

As shown in FIG. 1, the speech recognition apparatus 1 is provided in the vehicle 2.

First, a configuration that is included in the vehicle 2 is described with reference to FIG. 1 and FIG. 2.

As shown in FIG. 2, the vehicle 2 includes a sound collection unit 10, a driver seat 201, a passenger seat 202, a steering wheel 211, a shift lever 212, a parking brake•brake pedal 213, an accelerator pedal 214, a wheel 221, a power window 231, a door 232, and the like.

Further, as shown in FIG. 1, the vehicle 2 includes a travel equipment 20, an on-vehicle device 30, an operation information output unit 40, an operation input unit 51, and an operation input unit 52.

The operation input unit 51 is an input unit relating to the travel of the vehicle 2 and is, for example, the steering wheel 211, the shift lever 212, the parking brake•brake pedal 213, the accelerator pedal 214, a clutch pedal 215, or the like. The operation input unit 51 outputs an input result to the travel equipment 20.

The operation input unit 52 is an input unit relating to an operation command regarding an operation other than the travel of the vehicle and is an operation button for opening and closing the power window 231, a handle for opening and closing the door 232, a selector switch for switching between an ON state and an OFF state of the operation of a wiper 233, or the like. The operation input unit 52 outputs an input result to the on-vehicle device 30.

The travel equipment 20 includes a travel control unit 21, a travel mechanism 22, and a travel state detection unit 23.

The travel mechanism 22 is a power transmission device, a travel device, a control device, or the like and is, for example, a drive shaft, the wheel 221, a brake drum, or the like.

The travel control unit 21 controls the travel mechanism 22 in response to the result that is output by the operation input unit 51. Further, the travel control unit 21 outputs the controlled control result to the travel state detection unit 23.

The travel state detection unit 23 detects a travel state of the vehicle 2 based on the control result that is output by the travel control unit 21 and outputs travel state information indicating the detected travel state to the operation information output unit 40.

Note that, the travel state is a state whether or not the vehicle is traveling, a state what km/h (hour) is the vehicle speed, or the like.

The on-vehicle device 30 includes an operation control unit 31, an operation mechanism 32, and an operation state detection unit 33.

The operation mechanism 32 is an open and close mechanism of the power window 231, an open and close mechanism of the door 232, an operation mechanism of the wiper 233, or the like.

The operation control unit 31 controls the operation mechanism 32 in response to the result that is output by the operation input unit 52. Further, the operation control unit 31 outputs the controlled control result to the operation state detection unit 33.

The operation state detection unit 33 detects a state of the operation mechanism 32 based on the control result that is output by the operation control unit 31 and outputs operation state information indicating the detected operation state to the operation information output unit 40. Note that, the operation state is an open and close state of the power window 231, an open and close state of the door 232, an operation state of the wiper 233, or the like.

The operation information output unit 40 generates operation information by using the travel state information that is output by the travel state detection unit 23 and the operation state information that is output by the operation state detection unit 33 and outputs the generated operation information to the speech recognition apparatus 1 via a controller area network (CAN) 60. Note that, the CAN is a network that is used for data transfer between devices that are compliant with the CAN standard and are connected to each other. Further, the operation information includes at least one of the travel state information and the operation state information.

Note that, the travel control unit 21, the travel state detection unit 23, the operation control unit 31, the operation state detection unit 33, and the operation information output unit 40 are, for example, electric control units (ECUs). The ECU outputs the operation information to the speech recognition apparatus 1 via the CAN.

Next, the configuration included in the speech recognition apparatus 1 is described.

As shown in FIG. 1, the speech recognition apparatus 1 includes the sound collection unit 10, a speech signal acquisition unit 11, a transfer function storage unit 12, a sound source localization unit 13, a sound source separation unit 14, an operation information acquisition unit 15, a threshold value storage unit 16, a speech zone determination unit 17, a feature value calculation unit 18, and a speech recognition unit 19.

The sound collection unit 10 is a microphone and includes microphones 100-1 to 100-N (N is an integer equal to or more than 2). Note that, the sound collection unit 10 is a microphone array. Note that, the microphones 100-1 to 100-N are referred to as the microphone 100 unless any one of the microphones is specified. The sound collection unit 10 converts the collected speech signal into an electric signal and outputs the converted speech signal to the speech signal acquisition unit 11. Note that, the sound collection unit 10 may transmit the collected speech signals of N channels to the speech signal acquisition unit 11 in a wireless manner or a wired manner. The speech signals only have to be synchronized with each other between the channels at the time of transmission.

The speech signal acquisition unit 11 acquires speech signals of N channels that are collected by the N microphones 100 of the sound collection unit 10. The speech signal acquisition unit 11 applies, for example, discrete Fourier transform (DFT) on a speech signal $x_i(k)$ (k is an integer representing a sample time, i is an integer in the range of $1 \leq i \leq N$) for each channel i of the acquired speech signals of N channels to generate a frequency domain signal $x_i(\omega)$ ($\omega$ is a frequency) and outputs the generated frequency domain signal $x_i(\omega)$ to the sound source localization unit 13.

A transfer function $a_{\phi i}(\omega)$ from the microphone 100 to a predetermined position for each azimuth direction is stored in the transfer function storage unit 12. Note that, a N-dimensional vector $[a_{\phi 1}(\omega), a_{\phi 2}(\omega), \ldots, a_{\phi N}(\omega)]$ having a transfer function $a_{\phi i}(\omega)$ as an element is referred to as a transfer function vector $va_\phi(\omega)$.

The sound source localization unit 13 calculates a spatial spectrum as described below with respect to the speech signals of N channels input from the speech signal acquisition unit 11 by using the transfer function stored in the transfer function storage unit 12. The sound source localization unit 13 performs estimation (performs sound source localization) of an azimuth angle of a sound source based on the calculated spatial spectrum. The sound source localization unit 13 outputs the estimated azimuth angle information of the sound source and the input speech signals of N channels to the sound source separation unit 14. The sound source localization unit 13 estimates the azimuth angle by using, for example, a multiple signal classification (MUSIC) method. Note that, another sound source direction estimation method such as a beamforming method, a weighted delay and sum beam forming (WDS-BF) method, and a generalized singular value decomposition-multiple signal classification (GSVD-MUSIC) method may be used for estimation of the azimuth angle.

Further, the sound source localization unit 13 outputs a spatial spectrum of speech (first sound source) of a driver seated on the driver seat 201 of which the sound source is localized and a spatial spectrum of speech (second sound source) of a passenger seated on the passenger seat 202, for example, to the speech zone determination unit 17 for each frame. Here, the frame is a unit of data to be analyzed. For example, the frame length is 25 (msec), and the interval of frames is 10 (msec).

The sound source separation unit 14 acquires sound signals of N channels output by the sound source localization unit 13 and the estimated azimuth angle information of the sound source. The sound source separation unit 14 reads out a transfer function that corresponds to the acquired azimuth angle from the transfer function storage unit 12. The sound source separation unit 14 separates a speech signal for each sound source from the acquired sound signals of N channels by using the transfer function that is read out and, for example, a geometrically constrained high-order decorrelation based source separation with adaptive step-size control (GHDSS-AS) method which is a hybrid of blind separation and beamforming. The sound source separation unit 14 outputs the separated speech signal to the feature value calculation unit 18. Note that, the sound source separation unit 14 may perform a sound source separation process by using, for example, a beamforming method and the like.

The operation information acquisition unit 15 acquires the operation information output by the operation information output unit 40 and outputs the acquired operation information to the speech zone determination unit 17.

The threshold value storage unit 16 stores a threshold value for determining a speech zone for each travel state and for each operation state. Note that, the threshold value is described later.

The speech zone determination unit 17 reads out a threshold value that corresponds to the operation information output by the operation information acquisition unit 15 from the threshold value storage unit 16 and sets a threshold value with respect to a vehicle speed. The speech zone determination unit 17 determines that a zone in which the spatial spectrum output by the sound source localization unit 13 is equal to or more than the set threshold value is a speech zone and extracts the determined result as a speech zone determination result for each sound source. The speech zone determination result includes information indicating the presence or absence of speech for each sound source and for each frame. The speech zone determination unit 17 outputs the extracted speech zone determination result for each sound source to the feature value calculation unit 18.

The feature value calculation unit 18 calculates a sound feature value of a speech zone for each sound source from the speech signal for each sound source output by the sound source separation unit 14 based on the speech zone determination result for each sound source output by the speech zone determination unit 17 and outputs the calculated sound feature value for each sound source to the speech recognition unit 19. The feature value calculation unit 18 calculates a sound feature value, for example, by calculating a static Mel-scale log spectrum (MSLS), a delta MSLS, and one delta power at a predetermined time interval (for example, 10 ms). Note that, the MSLS is obtained by an inverse discrete cosine conversion of a Mel frequency cepstrum coefficient (MFCC) using a spectrum feature value as a feature value of sound recognition.

The speech recognition unit 19 performs a speech recognition process using the sound feature value for each sound source output by the feature value calculation unit 18 and recognizes the content of speech such as a phonological sequence or a word. Note that, the speech recognition unit 19 includes, for example, a hidden Markov model (HMM) which is a sound model and a word dictionary. The speech recognition unit 19 outputs the recognized recognition result to an external apparatus (not shown). The external apparatus is, for example, a car navigation system and the like.

<Process Performed by Speech Recognition Apparatus 1>

Next, a process sequence performed by the speech recognition apparatus 1 is described.

Figure 3:
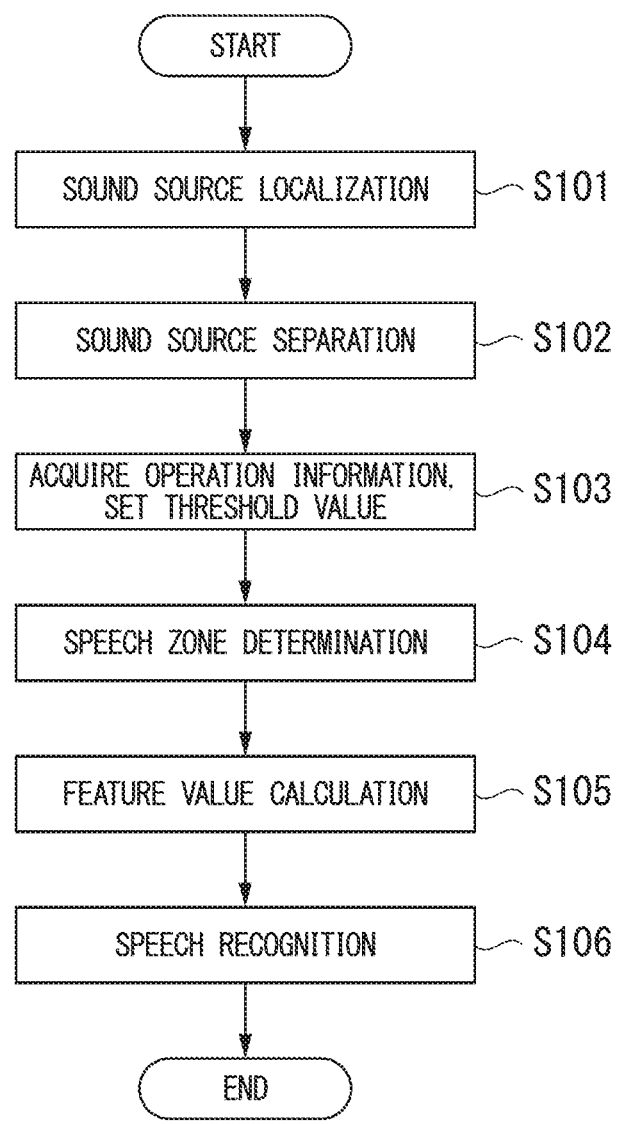
FIG. 3 is a flowchart of a process that is performed by the speech recognition apparatus according to the embodiment.

FIG. 3 is a flowchart of a process that is performed by the speech recognition apparatus 1 according to the present embodiment.

(Step S101) The sound source localization unit 13 calculates a spatial spectrum with respect to speech signals of N channels input from the speech signal acquisition unit 11 by using a transfer function stored in the transfer function storage unit 12. Subsequently, the sound source localization unit 13 performs sound source localization based on the calculated spatial spectrum, for example, according to a MUSIC method.

(Step S102) The sound source separation unit 14 separates a speech signal for each sound source from the sound signals of N channels output by the sound source localization unit 13 by using a transfer function that is stored in the transfer function storage unit 12 and that corresponds to an azimuth angle estimated by the sound source localization unit 13 and, for example, a GHDSS-AS method.

(Step S103) The operation information acquisition unit 15 acquires the operation information output by the operation information output unit 40. Subsequently, the speech zone determination unit 17 reads out a threshold value that corresponds to the operation information output by the operation information acquisition unit 15 from the threshold value storage unit 16 and sets threshold values $T_d(v)$ and $T_p(v)$ with respect to a vehicle speed v.

(Step S104) The speech zone determination unit 17 determines that a zone in which the spatial spectrum output by the sound source localization unit 13 is equal to or more than the set threshold value is a speech zone and extracts the determined result as a speech zone determination result for each sound source.

(Step S105) The feature value calculation unit 18 calculates a sound feature value of a speech zone for each sound source from the speech signal for each sound source output by the sound source separation unit 14 based on the speech zone determination result for each sound source output by the speech zone determination unit 17.

(Step S106) The speech recognition unit 19 performs a speech recognition process using the sound feature value for each sound source output by the feature value calculation unit 18 and recognizes the content of speech such as a phonological sequence or a word. Subsequently, the speech recognition unit 19 outputs the recognized recognition result to the external apparatus (not shown).

<Calculation of Spatial Spectrum, Estimation of Sound Source Localization>

Here, the outline of calculation of a spatial spectrum by a MUSIC method (for example, refer to Schmidt, 1986; Dan'es et al., 2010) and estimation of sound source localization is described.

The sound source localization unit 13 calculates a N×N correlation matrix $R(\omega)$ having a cross correlation of frequency domain signals $x_i(\omega)$ between channels for each frequency $\omega$ as an element, for example, according to Expression (1).

$$R(\omega) = E[vx(\omega)vx^H(\omega)] \quad (1)$$

In Expression (1), E[ . . . ] represents an expectation value of . . . . The $vx(\omega)$ is a N-dimensional vector $[x_1(\omega), x_2(\omega), \ldots, x_N(\omega)]$ having a frequency domain signal $x_i(\omega)$ as an element. The H represents a conjugate transpose of a vector or a matrix.

The sound source localization unit 13 calculates N eigenvalues $\lambda_i(\omega)$ and N eigenvectors $e_i(\omega)$ by an eigenvalue expansion of the correlation matrix $R(\omega)$. Note that, the correlation matrix $R(\omega)$, the eigenvalue $\lambda_i(\omega)$, and the eigenvector $e_i(\omega)$ satisfy a relationship represented by Expression (2).

$$R(\omega) = E(\omega)\Lambda(\omega)E^{-1}(\omega) \quad (2)$$

In Expression (2), the $E(\omega)$ is a N×N matrix $[e_1(\omega), e_2(\omega), \ldots, e_N(\omega)]$ having a eigenvector $e_i(\omega)$ as an element. The $\Lambda(\omega)$ is a N×N diagonal matrix that includes N eigenvalues $\lambda_1(\omega), \ldots, \lambda_2(\omega), \ldots, \lambda_N(\omega)$ as a diagonal element. Here, the index i represents the order of an eigenvector $e_i(\omega)$ in the matrix $E(\omega)$ and the order of an eigenvalue $\lambda_i(\omega)$ in the matrix $\kappa(\omega)$. The sound source localization unit 13 determines the index i in the descending order of the eigenvalues $\lambda_i(\omega)$ such that the index is 1 with respect to the maximum eigenvalue $\lambda_i(\omega)$ and the index is N with respect to the minimum eigenvalue $\lambda_i(\omega)$.

The sound source localization unit 13 calculates a MUSIC estimator $P(\omega,\phi))$ as an index value for each frequency based on a transfer function vector $va_\phi(\omega)$ for each sound source direction $\phi$ stored in the transfer function storage unit 12 and the calculated eigenvector $e_i(\omega)$, for example, according to Expression (3).

$$P(\omega, \phi) = \frac{|va_\phi^H(\omega)va_\phi(\omega)|}{\sum_{i=L+1}^{N} |va_\phi^H(\omega)e_i(\omega)|} \quad (3)$$

In Expression (3), the L is a predetermined number of sound sources and is an integer that is equal to or more than 1 and that is less than N. Further, the $e_i(\omega)$ is an eigenvector.

The sound source localization unit 13 calculates a spatial spectrum $P(\phi)$ in a frequency band of predetermined speech for each detected sound source direction $\phi$ by using the MUSIC estimator $P(\omega,\phi)$ and the maximum eigenvalue $\lambda_1(\omega)$, for example, according to Expression (4).

$$P(\phi) = \sum_{\omega=\omega_{min}}^{\omega_{max}} \sqrt{\lambda_1(\omega)} P(\omega, \phi) \quad (4)$$

In Expression (4), the $\omega_{min}$ represents a minimum frequency of the above frequency band, and the $\omega_{max}$ represents a maximum frequency. That is, Expression (4) represents that the spatial spectrum $P(\phi)$ is calculated by adding multiplication values of the MUSIC estimator $P(\omega,\phi)$ and a square root of the maximum eigenvalue $\lambda_1(\omega)$ over frequency elements.

The sound source localization unit 13 extracts a value that is equal to or more than a predetermined threshold value from the spatial spectrum $P(\phi)$.

The sound source localization unit 13 generates azimuth angle information representing a sound source direction $\phi$ that corresponds to each of the extracted values.

<Example of Spatial Spectrum>

Next, an example of a temporal variation in a spatial spectrum at the driver seat 201 and the passenger seat 202 is described.

Figure 4:
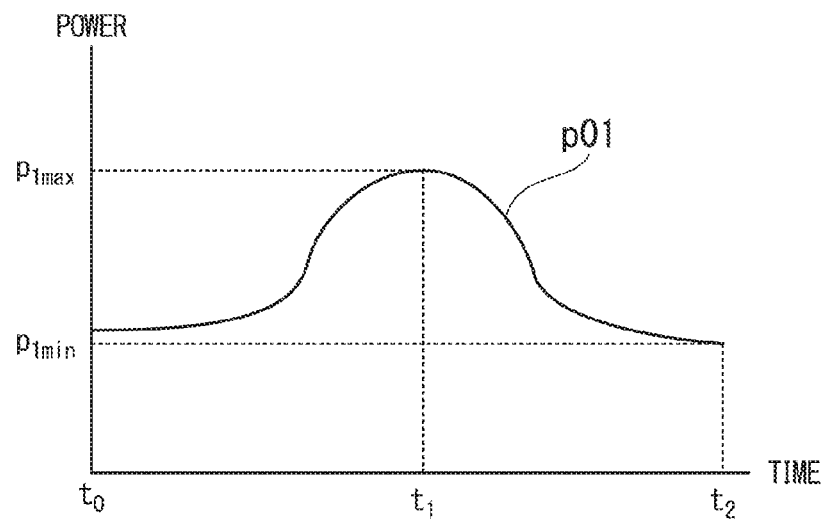
FIG. 4 is a view showing an example of a temporal variation in a spatial spectrum of a speech signal by a driver seated on a driver seat according to the embodiment.
Figure 5:
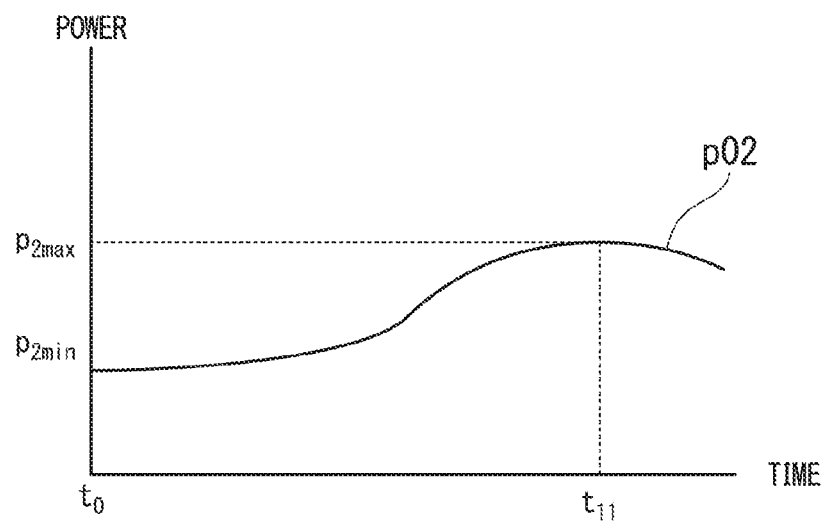
FIG. 5 is a view showing an example of a temporal variation in a spatial spectrum of a speech signal by a passenger seated on a passenger seat according to the embodiment.

FIG. 4 is a view showing an example of a temporal variation in a spatial spectrum of a speech signal by a driver seated on the driver seat 201 according to the present embodiment. FIG. 5 is a view showing an example of a temporal variation in a spatial spectrum of a speech signal by a passenger seated on the passenger seat 202 according to the present embodiment. In FIG. 4 and FIG. 5, the horizontal axis represents time, and the vertical axis represents power.

In FIG. 4, a curved line p01 represents a temporal variation in a power of a spatial spectrum of a speech signal of a driver seated on the driver seat 201. In the example shown in FIG. 4, the power at a time $t_1$ is a local maximum value $p_{1max}$, and the power at a time $t_2$ is a local minimum value $p_{1min}$.

In FIG. 5, a curved line p02 represents a temporal variation in a power of a spatial spectrum of a speech signal of a passenger seated on the passenger seat 202. In the example shown in FIG. 5, a power at a time $t_0$ is a local minimum value $p_{2min}$, and a power at a time $t_{11}$ is a local maximum value $p_{2max}$.

<Threshold Used in Speech Zone Detection>

Next, an example of a threshold value that is stored in the threshold value storage unit 16 is described.

FIG. 6 is a view showing an example of a threshold value with respect to a speech signal of a driver seated on the driver seat 201 that is stored in the threshold value storage unit 16 according to the present embodiment. FIG. 7 is a view showing an example of a threshold value with respect to a speech signal of the passenger seated on the passenger seat 202 that is stored in the threshold value storage unit 16 according to the present embodiment.

The examples shown in FIG. 6 and FIG. 7 are examples of a threshold value that is associated with a vehicle speed as the travel state and an operation of the wiper 233 (FIG. 2) as the operation state.

As shown in FIG. 6 and FIG. 7, a threshold value in a state where the wiper 233 is ON and a threshold value in a state where the wiper 233 is OFF are associated with each vehicle speed for each sound source.

As shown in FIG. 6, with respect to the speech signal of the driver, when the vehicle speed is equal to or less than 10 km/h, a threshold value of 29.0 dB as a threshold value in a state where the wiper 233 is ON is associated with the vehicle speed, and a threshold value of 29.0 dB as a threshold value in a state where the wiper 233 is OFF is associated with the vehicle speed. When the vehicle speed is more than 10 km/h and is equal to or less than 30 km/h, a threshold value of 29.0 dB as a threshold value in a state where the wiper 233 is ON is associated with the vehicle speed, and a threshold value of 30.5 dB as a threshold value in a state where the wiper 233 is OFF is associated with the vehicle speed. When the vehicle speed is more than 30 km/h and is equal to or less than 50 km/h, a threshold value of 30.0 dB as a threshold value in a state where the wiper 233 is ON is associated with the vehicle speed, and a threshold value of 30.5 dB as a threshold value in a state where the wiper 233 is OFF is associated with the vehicle speed. When the vehicle speed is more than 50 km/h, a threshold value of 30.5 dB as a threshold value in a state where the wiper 233 is ON is associated with the vehicle speed, and a threshold value of 30.5 dB as a threshold value in a state where the wiper 233 is OFF is associated with the vehicle speed.

As shown in FIG. 7, with respect to the speech signal of the passenger, when the vehicle speed is equal to or less than 10 km/h, a threshold value of 28.0 dB as a threshold value in a state where the wiper 233 is ON is associated with the vehicle speed, and a threshold value of 28.0 dB as a threshold value in a state where the wiper 233 is OFF is associated with the vehicle speed. When the vehicle speed is more than 10 km/h and is equal to or less than 30 km/h, a threshold value of 28.0 dB as a threshold value in a state where the wiper 233 is ON is associated with the vehicle speed, and a threshold value of 28.5 dB as a threshold value in a state where the wiper 233 is OFF is associated with the vehicle speed. When the vehicle speed is more than 30 km/h and is equal to or less than 50 km/h, a threshold value of 29.0 dB as a threshold value in a state where the wiper 233 is ON is associated with the vehicle speed, and a threshold value of 29.5 dB as a threshold value in a state where the wiper 233 is OFF is associated with the vehicle speed. When the vehicle speed is more than 50 km/h, a threshold value of 29.5 dB as a threshold value in a state where the wiper 233 is ON is associated with the vehicle speed, and a threshold value of 29.5 dB as a threshold value in a state where the wiper 233 is OFF is associated with the vehicle speed.

As shown in FIG. 6 and FIG. 7, in the present embodiment, a threshold value with respect to the speech signal of the driver seated on the driver seat 201 is set to be higher than the speech signal of the passenger at the same vehicle speed.

The reason is to recognize the speech signal of the driver in priority to the speech signal of the passenger.

Therefore, the magnitude relationship of the threshold value with respect to each of the driver seat and the passenger seat may be switched depending on the use of the recognized speech, for example, by the user (driver or passenger).

Further, each threshold value shown in FIG. 6 and FIG. 7 may be set, for example, based on a power of a spatial spectrum of a speech signal (also referred to as a sound signal) obtained by collecting noise in each vehicle speed v of the vehicle 2 using the sound collection unit 10.

Further, in the examples shown in FIG. 6 and FIG. 7, the ON state and the OFF state of the wiper 233 are described as an example of the operation state; however, the operation state is not limited thereto. Such a threshold value that a state where the power window 231 is opened and a state where the power window 231 is closed are associated with a vehicle speed may be stored in the threshold value storage unit 16. Such a threshold value that a state where the door 232 is opened and a state where the door 232 is closed are associated with a vehicle speed may be stored in the threshold value storage unit 16.

Further, the threshold value stored in the threshold value storage unit 16 is not limited to be in a tabular form. A mathematical expression of the threshold value $T_d(v)$ at the vehicle speed v and a mathematical expression of the threshold value $T_p(v)$ at the vehicle speed v may be stored.

Here, an example of the relationship between the vehicle speed v and the threshold value $T_d(v)$ and an example of the relationship between the vehicle speed v and the threshold value $T_p(v)$ are described with reference to FIG. 6 to FIG. 8.

Note that, the threshold value $T_d(v)$ is a threshold value with respect to a power in a speech signal of a driver seated on the driver seat 201. The threshold value $T_p(v)$ is a threshold value with respect to a power in a speech signal of a passenger seated on the passenger seat 202.

Figure 8:
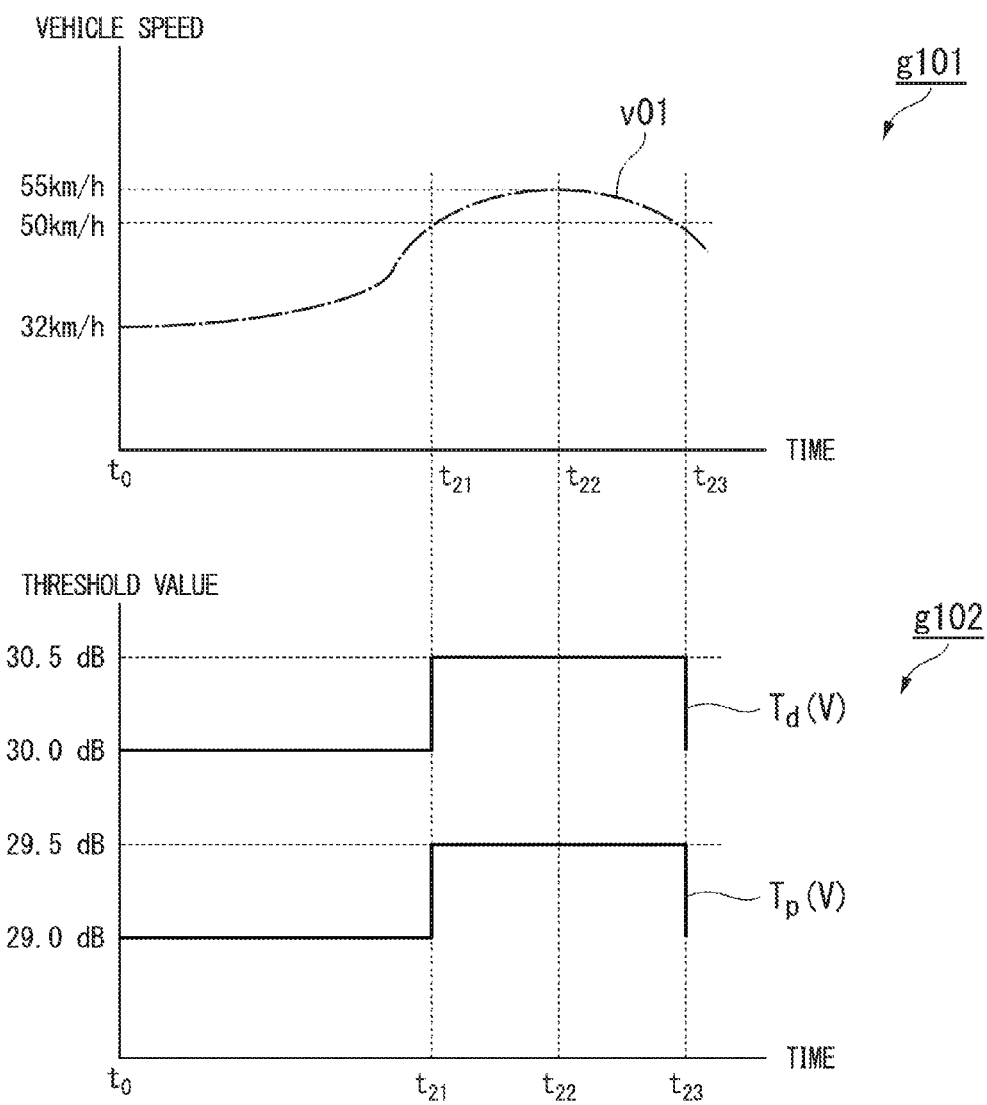
FIG. 8 is a view showing an example of a vehicle speed v, a threshold value $T_d(v)$, and a threshold value $T_p(v)$ according to the embodiment.

FIG. 8 is a view showing an example of a relationship between the vehicle speed v and the threshold value $T_d(v)$ and an example of a relationship between the vehicle speed v and the threshold value $T_p(v)$ according to the present embodiment. In FIG. 8, a graph g101 is a graph that represents a relationship between the vehicle speed v and time, and a graph g102 is a graph that represents a relationship between the threshold value $T_d(v)$ and time and a relationship between the threshold value $T_p(v)$ and time. In the graph g101 and the graph g102, the horizontal axis represents time. In the graph g101, the vertical axis represents a vehicle speed v. In the graph g102, the vertical axis represents a threshold value dB. Further, the threshold value $T_d(v)$ and the threshold value $T_p(v)$ shown in the graph g102 are threshold values in a state where the wiper 233 is ON.

As shown in a curved line v01 of the graph g101, the vehicle speed v is increased to 50 km/h from 32 km/h for time $t_0$ to time $t_{21}$. The vehicle speed v is increased to 55 km/h from 50 km/h for time $t_{21}$ to time $t_{22}$. The vehicle speed v is decreased to 50 km/h from 55 km/h for time $t_{22}$ to time $t_{23}$. The vehicle speed v is further decreased from 50 km/h after time $t_{23}$.

As shown in FIG. 6, when the wiper is in the ON state, the threshold value $T_d(v)$ with respect to the speech of the driver is 30.0 dB in a case where the vehicle speed v is more than 30 km/h and is equal to or less than 50 km/h and is 30.5 dB in a case where the vehicle speed v is more than 50 km/h. Therefore, as shown in the graph g102, the threshold value $T_d(v)$ of the zone of time $t_0$ to $t_{21}$ is 30.0 dB, and the threshold value $T_d(v)$ of the zone of time $t_{21}$ to $t_{23}$ is 30.5 dB.

Further, as shown in FIG. 7, when the wiper is in the ON state, the threshold value $T_p(v)$ with respect to the speech of the driver is 29.0 dB in a case where the vehicle speed v is more than 30 km/h and is equal to or less than 50 km/h and is 29.5 dB in a case where the vehicle speed v is more than 50 km/h. Therefore, as shown in the graph g102, the threshold value $T_p(v)$ of the zone of time $t_0$ to $t_{21}$ is 29.0 dB, and the threshold value $T_d(v)$ of the zone of time $t_{21}$ to $t_{23}$ is 29.5 dB.

<Detection of Speech Zone>

Next, an example of a speech zone according to the speech zone determination unit 17 is described.

Figure 9:
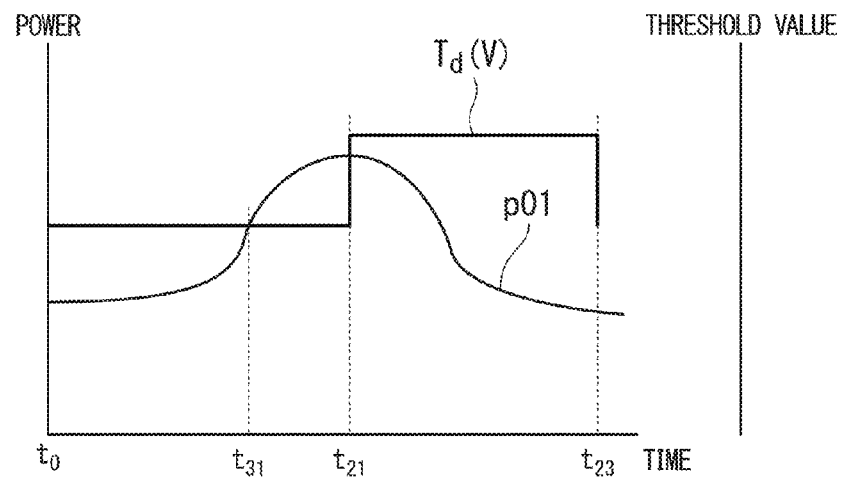
FIG. 9 is a view showing an example of a temporal variation of a power and a threshold value in the speech signal of the driver seated on the driver seat according to the embodiment.
Figure 10:
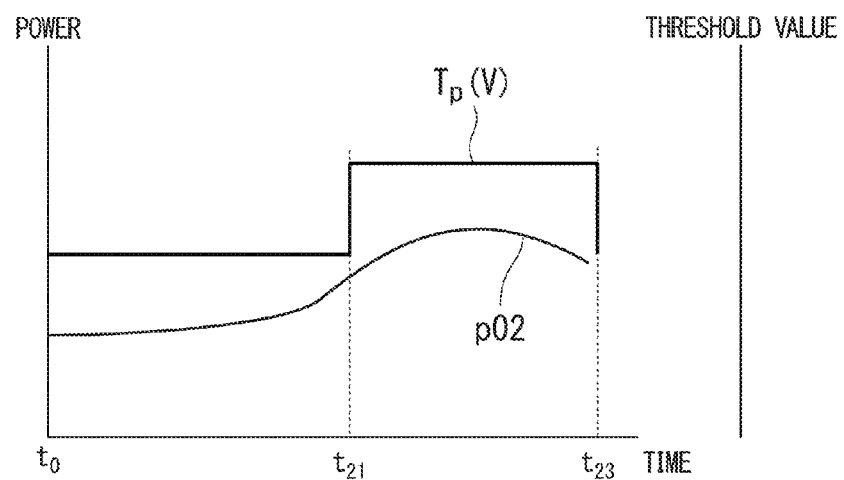
FIG. 10 is a view showing an example of a temporal variation of a power and a threshold value in the speech signal of the passenger seated on the passenger seat according to the embodiment.

FIG. 9 is a view showing an example of a temporal variation of a power and a threshold value in a speech signal of a driver seated on the driver seat 201 according to the present embodiment. FIG. 10 is a view showing an example of a temporal variation of a power and a threshold value in a speech signal of a passenger seated on the passenger seat 202 according to the present embodiment. In FIG. 9 and FIG. 10, the horizontal axis represents time, and the vertical axis represents power and threshold value. Note that, in FIG. 9 and FIG. 10, the variation of the vehicle speed with respect to a time in time $t_0$ to $t_{23}$ is the same as that of FIG. 8. Therefore, a threshold value $T_d(v)$ and a threshold value $T_p(v)$ are also similar to those of FIG. 8.

In the example shown in FIG. 9, a speech p01 of a driver exceeds the threshold value $T_d(v)$ in the zone of time $t_{31}$ to $t_{21}$, and the speech p01 is less than the threshold value $T_d(v)$ in the other zone. Therefore, the speech zone determination unit 17 determines that the zone of time $t_{31}$ to $t_{21}$ is a speech zone of the driver.

In the example shown in FIG. 10, a speech p02 of a passenger is less than the threshold value $T_p(v)$ in the zone of time $t_0$ to $t_{23}$. Therefore, the speech zone determination unit 17 determines that there is no speech zone of the passenger in time $t_0$ to $t_{23}$.

Note that, the threshold values shown in FIG. 8 to FIG. 10 are examples and are not limited thereto. When the threshold values $T_d(v)$ and $T_p(v)$ stored in the threshold value storage unit 16 are functions relating to the vehicle speed v, the threshold values $T_d(v)$ and $T_p(v)$ may be, for example, curved lines based on the curved line v01 of FIG. 8.

Further, in the example described above, an example in which the speech zone determination unit 17 outputs the speech zone determination result to the feature value calculation unit 18 is described; however, the embodiment is not limited thereto. The speech zone determination unit 17 may output the speech zone determination result to the speech recognition unit 19. In this case, the feature value calculation unit 18 may calculate a sound feature value for each sound source, and the speech recognition unit 19 may perform speech recognition by using a sound feature value of a speech zone for each sound source based on a speech zone determination result.

As described above, the speech recognition apparatus 1 according to the present embodiment includes: the sound collection unit 10 that collects a sound signal; the sound source localization unit 13 that calculates a spatial spectrum from the sound signal that is collected by the sound collection unit and uses the calculated spatial spectrum to perform sound source localization; the speech zone determination unit 17 that determines a zone in which a power of the spatial spectrum that is calculated by the sound source localization unit exceeds a predetermined threshold value based on a vehicle state; and the speech recognition unit 19 that performs speech recognition with respect to a sound signal of the zone determined by the speech zone determination unit.

According to the configuration, it is possible to detect a speech zone by using a threshold value based on a vehicle state. Thereby, in the present embodiment, it is possible to extract a speech signal that is greater than noise in response to the vehicle state. As a result, the speech recognition apparatus 1 of the present embodiment can reduce the effect of noise that is generated in response to the vehicle state.

Further, in the speech recognition apparatus 1 of the present embodiment, the vehicle state is at least one of a travel state of the vehicle and an operation state of the vehicle.

According to the configuration, in the present embodiment, it is possible to detect a speech zone of a sound source by using a threshold value in response to at least one of the travel state and the operation state of the vehicle. In the present embodiment, by performing speech recognition on a speech signal of the speech zone detected in this way, it is possible to extract a speech signal that is greater than noise in response to at least one of the travel state and the operation state of the vehicle. As a result, the speech recognition apparatus 1 of the present embodiment can reduce the effect of noise that is generated in response to at least one of the travel state and the operation state of the vehicle.

Further, in the speech recognition apparatus 1 of the present embodiment, a travel state of the vehicle is a state based on a vehicle speed, and an operation state of the vehicle is at least one of an open and close state of the power window 231, an open and close state of the door 232, and an operation state of the wiper 233.

According to the configuration, in the present embodiment, it is possible to detect a speech zone of a sound source by using a threshold value in response to at least one of the state based on the vehicle speed, the open and close state of the power window, the open and close state of the door, and the operation state of the wiper. In the present embodiment, by performing speech recognition on a speech signal of the speech zone detected in this way, it is possible to extract a speech signal that is greater than noise in response to at least one of the state based on the vehicle speed, the open and close state of the power window, the open and close state of the door, and the operation state of the wiper. As a result, the speech recognition apparatus 1 of the present embodiment can reduce the effect of noise that is generated in response to at least one of the state based on the vehicle speed, the open and close state of the power window, the open and close state of the door, and the operation state of the wiper.

Further, the speech recognition apparatus 1 of the present embodiment includes the sound source separation unit 14 that separates a speech signal of a driver seated on the driver seat 201 from a speech signal of a passenger seated on the passenger seat 202 based on the sound source localization result by the sound source localization unit 13, wherein the speech recognition unit 19 determines a zone in which a power of the spatial spectrum exceeds a predetermined threshold value based on the vehicle state with respect to the speech signal of the driver separated by the sound source separation unit or the speech signal of the passenger separated by the sound source separation unit.

According to the configuration, in the present embodiment, it is possible to reduce the effect of noise that is generated in response to a vehicle state by performing speech recognition using a speech signal of a zone in which the speech of the driver or the passenger after the sound source separation is equal to or more than the threshold value.

Further, in the speech recognition apparatus 1 of the present embodiment, the predetermined threshold value ($T_d(v)$ or $T_p(v)$) is associated with a vehicle speed v, an operation state of the vehicle 2, and a sound source of the driver or a sound source of the passenger.

According to the configuration, in the present embodiment, it is possible to appropriately detect a speech zone of the driver or the passenger by using a threshold value for each vehicle speed, for each operation state of the vehicle, and for each driver or passenger. In the present embodiment, by performing speech recognition on a speech signal of the speech zone detected in this way, it is possible to extract a speech signal that is greater than noise in response to the vehicle state. As a result, the speech recognition apparatus 1 of the present embodiment can reduce the effect of noise that is generated in response to the vehicle state.

Further, in the speech recognition apparatus 1 of the present embodiment, the predetermined threshold value ($T_d(v)$ or $T_p(v)$) is configured such that the predetermined threshold value with respect to a sound source of the driver is greater than the predetermined threshold value with respect to a sound source of the passenger.

According to the configuration, in the present embodiment, it is possible to perform speech recognition such that the speech of the driver is prioritized to the speech of the passenger.

Note that, part of or all the constituent elements of the speech recognition apparatus 1 of the present embodiment may be implemented by a smartphone, a mobile terminal, a mobile game apparatus, and the like.

Further, in the present embodiment, an example in which the speech recognition apparatus 1 is attached to the vehicle 2 is described; however, the embodiment is not limited thereto. The speech recognition apparatus 1 can also be applied to, for example, a train, an airplane, a ship, a room in a house, a shop, and the like as long as the relationship between a noise component and a power of speech changes depending on a state of an apparatus to which the speech recognition apparatus 1 is applied.

Note that, detection of a speech zone, speech recognition, or the like may be performed by recording a program for performing the functions of the speech recognition apparatus 1 according to the invention on a non-transitory computer-readable recording medium, reading the program recorded on the recording medium into a computer system, and executing the program. Here, the "computer system" may include an OS or hardware such as peripherals. The "computer system" may include a WWW system including a homepage providing environment (or display environment). Examples of the "computer-readable recording medium" include portable mediums such as a flexible disk, a magneto-optical disk, a ROM, and a CD-ROM and a storage device such as a hard disk built in a computer system. The "computer-readable recording medium" may include a medium that temporarily holds a program for a predetermined time, like a volatile memory (RAM) in a computer system serving as a server or a client in a case where the program is transmitted via a network such as the Internet or a communication circuit such as a telephone circuit.

The program may be transmitted from a computer system storing the program in a storage device or the like to another computer system via a transmission medium or by transmission waves in the transmission medium. Here, the "transmission medium" via which the program is transmitted means a medium having a function of transmitting information such as a network (communication network) such as the Internet or a communication circuit (communication line) such as a telephone line. The program may be configured to realize part of the above-mentioned functions. Further, the program may be configured to realize the above-mentioned functions by combination with a program recorded in advance in a computer system, like a so-called differential file (differential program).

While preferred embodiments of the invention have been described and shown in the drawings, it should be understood that the present invention is not limited to the above embodiments, and additions, omissions, substitutions, and other modifications of the configuration can be made without departing from the scope of the present invention. Accordingly, the invention is not to be considered as being limited by the foregoing description, and is only limited by the scope of the appended claims.

The invention claimed is:

1. A speech recognition apparatus comprising:
   a sound collection unit that collects a sound signal;
   a sound source localization unit that calculates a spatial spectrum from the sound signal that is collected by the sound collection unit and uses the calculated spatial spectrum to perform sound source localization;
   a speech zone determination unit that determines a zone in which a power of the spatial spectrum that is calculated by the sound source localization unit exceeds a predetermined threshold value based on a vehicle state; and
   a speech recognition unit that performs speech recognition with respect to a sound signal of the zone determined by the speech zone determination unit.

2. The speech recognition apparatus according to claim 1, wherein
   the vehicle state is at least one of a travel state of the vehicle and an operation state of the vehicle.

3. The speech recognition apparatus according to claim 2, wherein
   the travel state of the vehicle is a state based on a vehicle speed, and
   the operation state of the vehicle is at least one of an open and close state of a power window, an open and close state of a door, and an operation state of a wiper.

4. The speech recognition apparatus according to claim 1, comprising
   a sound source separation unit that separates a speech signal of a driver seated on a driver seat from a speech signal of a passenger seated on a passenger seat based on the sound source localization result by the sound source localization unit, wherein
   the speech recognition unit determines a zone in which a power of the spatial spectrum exceeds a predetermined threshold value based on the vehicle state with respect to the speech signal of the driver separated by the sound source separation unit or the speech signal of the passenger separated by the sound source separation unit.

5. The speech recognition apparatus according to claim 4, wherein the predetermined threshold value is associated with a vehicle speed, an operation state of the vehicle, and a sound source of the driver or a sound source of the passenger.

6. The speech recognition apparatus according to claim 4, wherein the predetermined threshold value is configured such that the predetermined threshold value with respect to a sound source of the driver is greater than the predetermined threshold value with respect to a sound source of the passenger.

7. A speech recognition method comprising:

(a) by way of a sound collection unit, collecting a sound signal;

(b) by way of a sound source localization unit, calculating a spatial spectrum from the sound signal that is collected in (a) and using the calculated spatial spectrum to perform sound source localization;

(c) by way of a speech zone determination unit, determining a zone in which a power of the spatial spectrum that is calculated in (b) exceeds a predetermined threshold value based on a vehicle state; and (d) by way of a speech recognition unit, performing speech recognition with respect to a sound signal of the zone determined in (c).

\* \* \* \* \*